United States Patent [19]

Beck et al.

[11] Patent Number: 5,960,065
[45] Date of Patent: *Sep. 28, 1999

[54] TWO-LINE TELEPHONE CONTROLLER WITH HOLD FEATURE

[75] Inventors: Gregory F. Beck, Laguna Hills; Douglas L. Palmer, Foothill Ranch; James A. Fontana, Mission Viejo; Richard D. Ray, Mountain View, all of Calif.

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/615,777

[22] Filed: Mar. 14, 1996

Related U.S. Application Data

[63] Continuation-in-part of application No. 08/160,824, Dec. 3, 1993, Pat. No. 5,515,423.

[51] Int. Cl.⁶ .............................. H04M 11/00; H04M 1/00
[52] U.S. Cl. ...................... 379/93.07; 379/162; 379/163; 379/100.12
[58] Field of Search .................... 375/222; 379/90.01, 379/93.05, 93.07, 156, 162, 163, 423, 100

[56] References Cited

U.S. PATENT DOCUMENTS

| | | | |
|---|---|---|---|
| 3,771,134 | 11/1973 | Huettner et al. | 395/325 |
| 3,879,579 | 4/1975 | Fretwell et al. | 379/93.05 |
| 3,920,928 | 11/1975 | Lye | 379/163 |
| 4,578,537 | 3/1986 | Faggin et al. | 379/93 |
| 4,628,153 | 12/1986 | Daly | 379/163 |
| 4,640,989 | 2/1987 | Riner et al. | 379/94 |
| 4,825,461 | 4/1989 | Kurita et al. | 379/93.07 |
| 4,852,153 | 7/1989 | Streck | 379/100 |
| 4,924,494 | 5/1990 | Shung | 379/100 |
| 5,048,073 | 9/1991 | Weiser et al. | 379/90.01 |
| 5,056,132 | 10/1991 | Coleman et al. | 379/95 |
| 5,056,133 | 10/1991 | Iida | 379/98 |
| 5,131,026 | 7/1992 | Park | 379/100 |
| 5,142,567 | 8/1992 | Watanabe | 379/100 |
| 5,151,972 | 9/1992 | Lorenz et al. | 379/93 |
| 5,224,155 | 6/1993 | Satomi et al. | 379/100 |
| 5,283,819 | 2/1994 | Glick et al. | 379/93 |
| 5,408,525 | 4/1995 | Eldering | 379/162 |
| 5,590,185 | 12/1996 | Sandler et al. | 379/163 |

FOREIGN PATENT DOCUMENTS

| | | |
|---|---|---|
| 282628 | 4/1983 | European Pat. Off. . |
| 666680 | 8/1995 | European Pat. Off. . |
| 2650141 | 1/1991 | France . |
| 2249240 | 4/1992 | United Kingdom . |
| 9004299 | 4/1990 | WIPO . |

OTHER PUBLICATIONS

"4LS User Manual", Version 1.0, BICOM Computer and Communications Systems, pp. 1–5.

"RC96ACL/RC144ACL Modem Designer's Guide", Rockwell International Digital Communications Division, published 1993.

"DAA Designers Guide", Duane Marcroft, Sep. 1989.

*Primary Examiner*—Vivian Chang
*Assistant Examiner*—George Eng
*Attorney, Agent, or Firm*—Fitzpatrick, Cella, Harper & Scinto

[57] ABSTRACT

In a two-line telephone controller which includes a line select switch which operates complementarily to a force busy relay that allows an unselected telephone line to be forced to a busy state, a method for using the force busy relay also to place an active line on hold. The method includes detecting an incoming call on an inactive line, switching the line select switch to the inactive line, receiving an instruction to place the active line on hold, and responding to the hold instruction by closing an off-hook relay so as to connect the force busy switch across the active telephone line, opening a first handset select switch for the active telephone line, and closing a second handset select switch so as to select the incoming call on the ringing line. Because the force busy switch is connected across the formerly-active telephone line, loop current is maintained, thereby placing and maintaining the formerly-active call on hold.

12 Claims, 13 Drawing Sheets

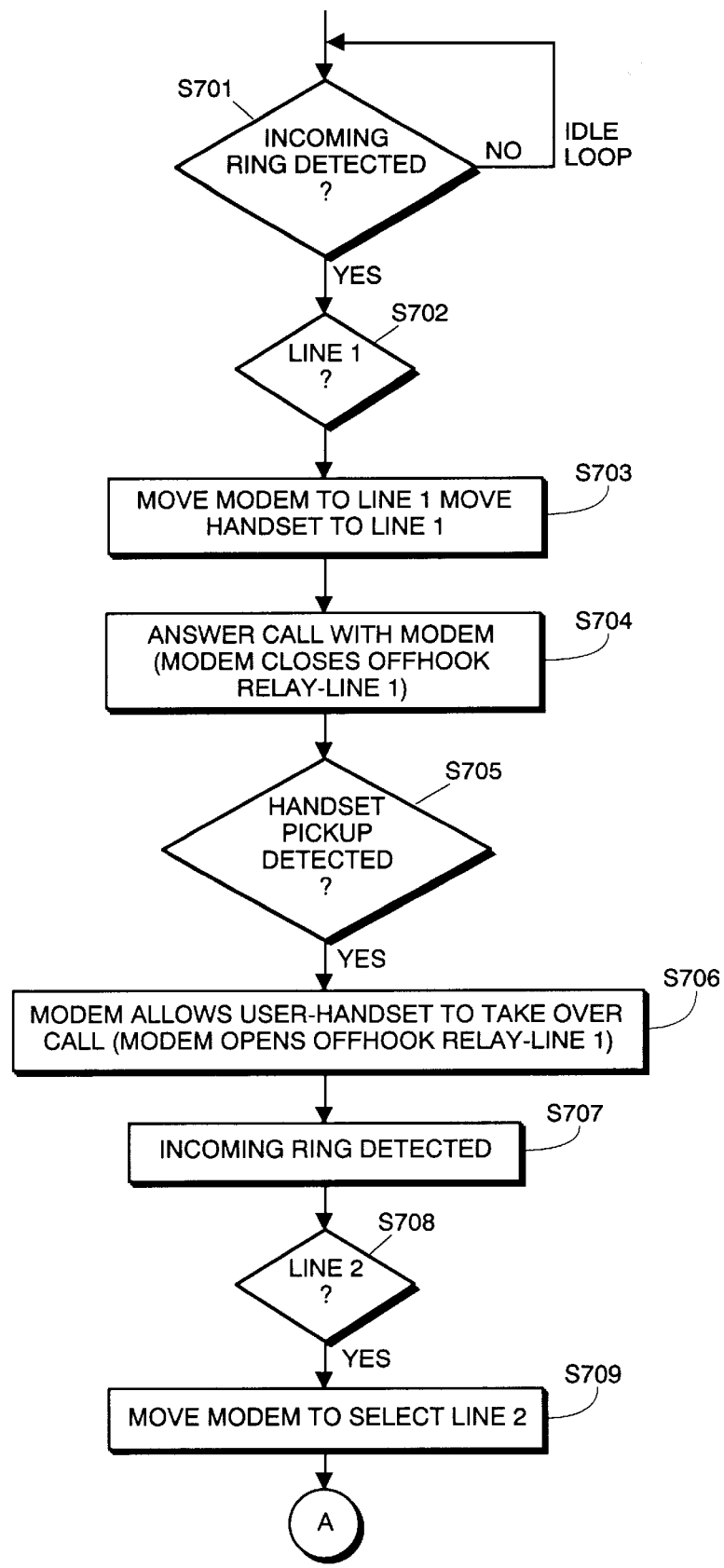

TWO-LINE TELEPHONE CONTROLLER WITH HOLD FEATURE

RELATED APPLICATIONS

This application is a continuation-in-part of prior U.S. application No. 08/160,824, filed Dec. 3, 1993, entitled "Two-Line Telephone Controller", which issued as U.S. Pat. No. 5,515,423.

BACKGROUND

1. Field of the Invention

The present invention concerns a method for operating a two-line telephone controller so as to obtain a hold feature by which a currently active one of at least two telephone lines is placed and maintained in a hold state.

2. Description of the Related Art

Application No. 08/160,824 describes a computer controllable telephone control board which interfaces between a computer and multiple telephone lines so as to provide the computer with control over multiple telephone lines. In the embodiment described in application No. 08/160,824, two telephone lines are controlled, with the board allowing the telephone lines to be connected to the computer (via a fax/modem/voice chipset, so as to permit computer-controlled fax and modem data transfers, as well as to permit ordinary voice communication using a microphone and speakers connected to the computer), or to be connected to a conventional telephone handset (via a telephone handset interface so as to permit ordinary voice communication over the handset).

The telephone control board of application No. 08/160,824 includes a "force busy" relay which causes an unused telephone line to appear busy when the active telephone line is connected to the computer, such as for modem transfers. As described in application No. 08/160,824, this "force busy" feature is advantageous, especially when the computer is not attended by the user, since the caller will be confronted by a busy signal rather than a ringing signal that is never answered. When confronted by a busy signal, most callers will simply call back later; in fact, most conventional facsimile machines have an automatic re-dial feature which calls back later automatically.

SUMMARY OF THE INVENTION

The present invention obtains a hold feature in a telephone control board which, like that in application No. 08/160,824, includes a force busy relay. According to the invention, the same "force busy" relay by which an unused telephone line is forced busy is also used to place an active call on hold.

Thus, one aspect the invention is a method for operating a telephone control board having a line select switch which connects to computerized telephone communication equipment to a selected one of multiple telephone lines through off-hook relays respectively provided for each telephone line, a force busy switch which operates complementarily to the line select switch and by which force busy means is connectable across unselected ones of the multiple telephone lines through the respective off-hook relays so as to maintain loop current in the unselected ones of the multiple telephone lines, and handset select switches respectively provided for each of the multiple telephone lines so as to connect a telephone handset interface to any one of the multiple telephone lines. According to the invention, the line select switch, the force busy switch, the off-hook relays, and the handset select switches, are controlled so as to place and maintain a currently active one of the multiple telephone lines in a hold state. Specifically, a first handset select switch is closed so as to connect the telephone handset interface to a first telephone line which is currently active. An incoming call is detected on a second telephone line, and the line select switch is switched so as to ready the computerized telephone communication equipment for connection to the second telephone line, thereby switching the force busy switch so as to ready others of the multiple telephone lines for connection to the force busy means. An instruction to place the first telephone line on hold is then received, such as from a user operating a graphical user interface on the computer. In response to the hold instruction, an off-hook relay for the first telephone line is closed, thereby connecting the force busy means across the first telephone line, the first handset select switch is opened, and a second handset select switch is closed so as to connect the telephone handset interface to the second telephone line. Because the force busy means is connected across the first telephone line, loop current is maintained and the first telephone line is maintained in a hold state.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
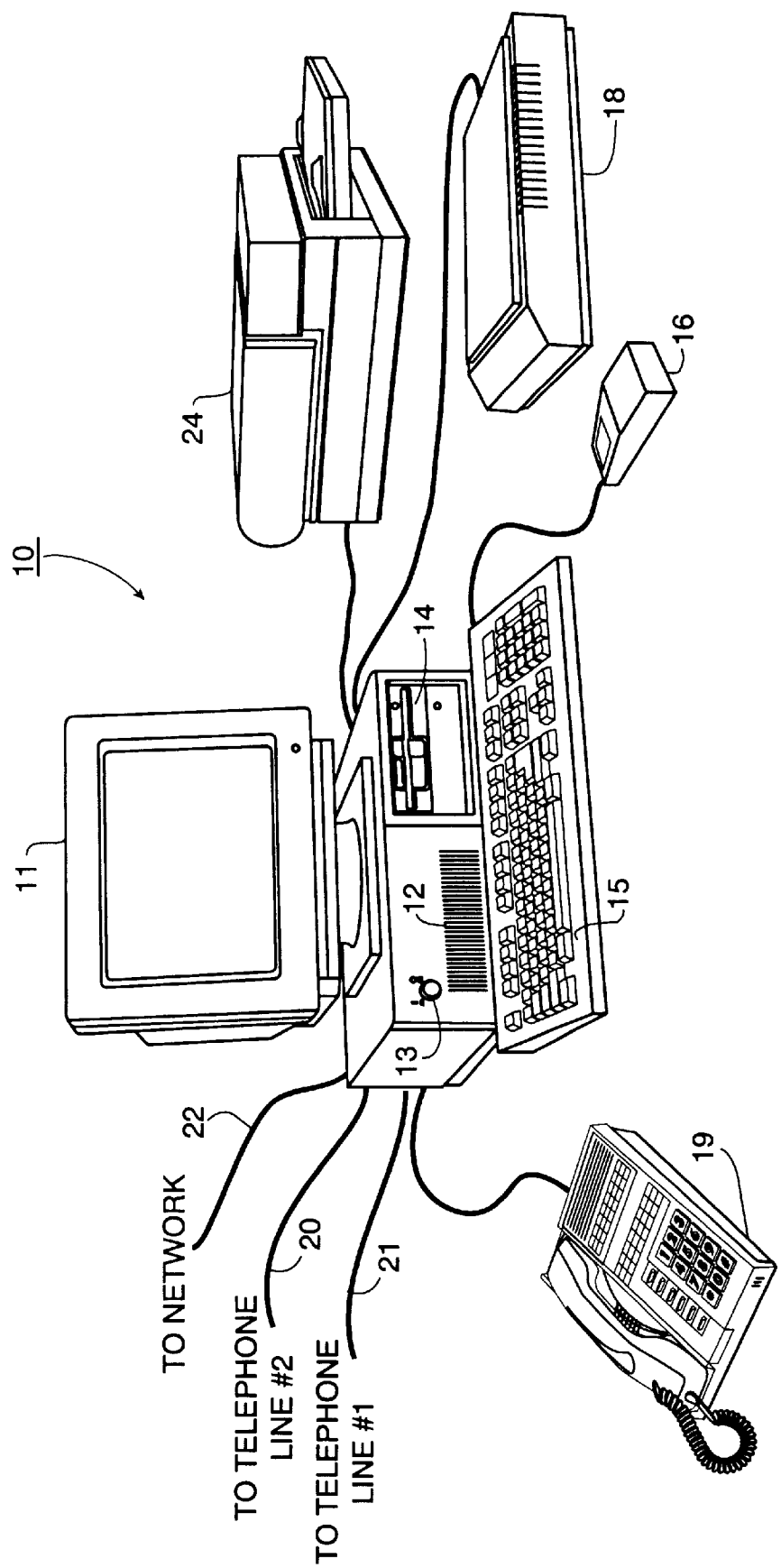
FIG. 1 is a perspective view of the outward appearance of an apparatus illustrative of a communication arrangement for personal computing equipment in which the present invention is incorporated.

FIG. 1 is a view showing the outward appearance of a representative embodiment of the invention. Shown in FIG. 1 is computing equipment 10 such as an IBM PC or PC-compatible computer having an operating system such as a Microsoft Windows operating system. The computing equipment 10 is provided with a display screen 11 such as a color monitor, a speaker 12 and a microphone 13. Computing equipment 10 further includes a mass storage device such as a computer disk drive 14 for storing data files such as bitmap image data files, text data files, sound (e.g., PCM or pulse code modulation) data files, animation data files and digital motion video data files, in compressed or uncompressed format; and for storing application program files such as a multimedia message management program that can send and receive the aforementioned types of data files, or other information processing program files which contain stored program instruction steps by which computing equipment 10 manipulates data files, presents data in those files to an operator via display screen 11 or speaker 12, or transmits data via telephone lines or network interfaces, or the like.

Keyboard 15 is connected to computing equipment 10 to permit input of text data and to permit operator selection and manipulation of objects displayed on display screen 11. Likewise, pointing device 16 such as a mouse or the like is connected to permit selection and manipulation of objects and graphical user interfaces on the display screen. Scanner 18 scans documents or other images and provides bitmap images of those documents to computing equipment 10. Network interface line 22 connects computing equipment 10 to an unshown local area network, and printer 24 is provided for outputting information processed by computing equipment 10.

An unshown communication board, which is described in considerable detail below, connects computing equipment 10 to an ordinary telephone handset 19 as well as to multiple telephone lines, here two telephone lines 20 and 21.

In accordance with operator instructions, stored application programs are activated and permit processing and manipulation of data. For example, any of a variety of application programs such as a multimedia message management program, a word processing program, an image editing program, spreadsheet programs, and similar information processing programs, may be provided for operator selection and use. Thus, a word processing program may be activated to permit an operator to create, view, manipulate and print documents, and to send or receive documents via a communication board and one of the multiple telephone lines. Likewise, a multimedia message management program may be activated to permit an operator to create, manipulate and view multimedia documents which contain a variety of objects such as text objects, bitmap objects, computer graphic objects, sound objects and motion video objects, and to send and to receive such multimedia documents via the communication board on one of the multiple telephone lines. The multimedia message management program may also be provided with telephone handset control capabilities with which an operator, through manipulation and use of a computerized address list, may instruct the computer to cause a selected telephone line to go off-hook, a selected telephone number to be dialed, and indicate to the operator that the called party has answered. Incoming calls may also be handled by the computer, and a telephone usage log may be maintained.

Figure 2:
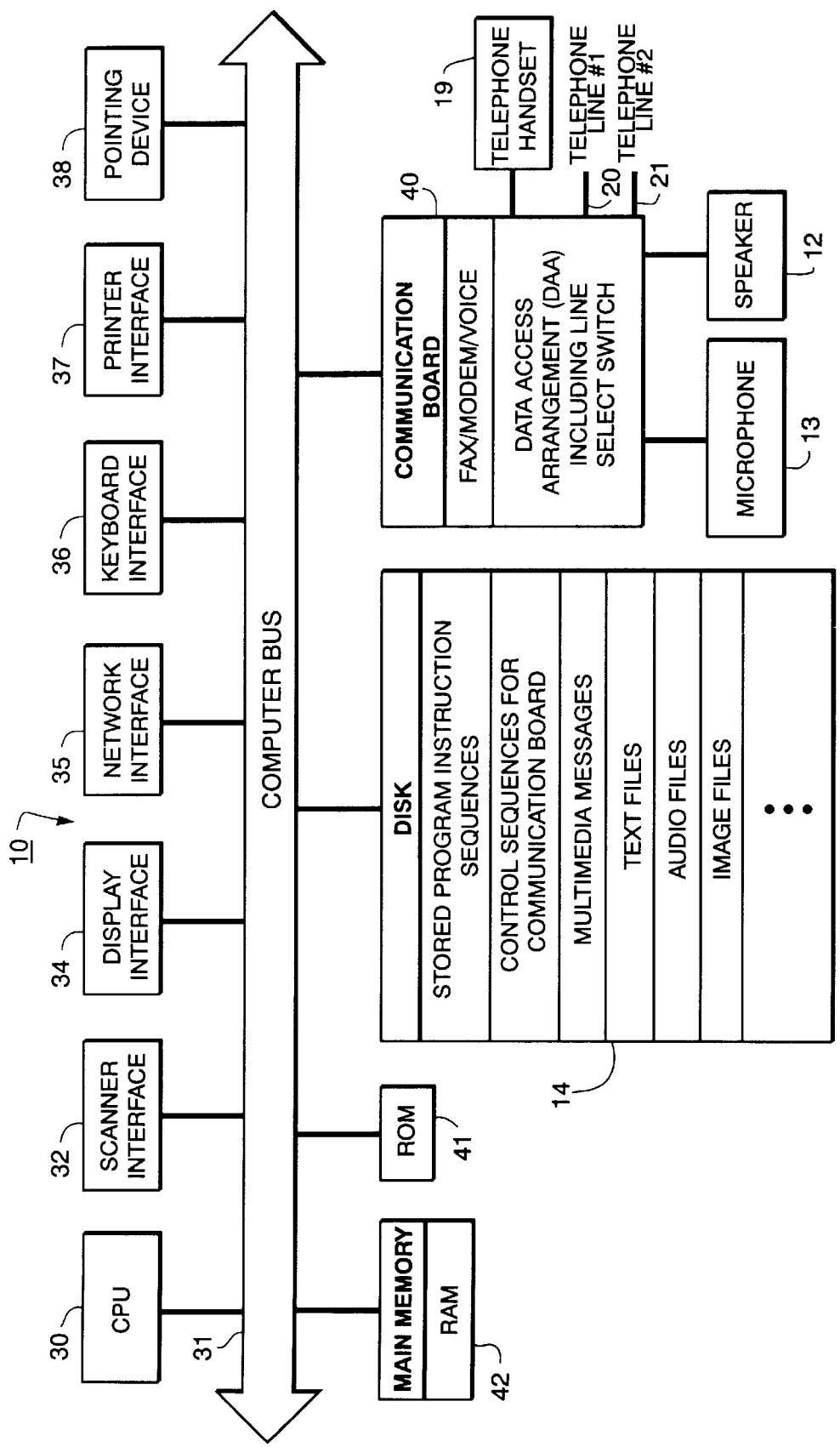
FIG. 2 is a block diagram of the FIG. 1 apparatus.

FIG. 2 is a detailed block diagram showing the internal construction of computing equipment 10. As shown in FIG. 2, computing equipment 10 includes central processing unit (CPU) 30 such as an 80386 or a reduced instruction set computer (RISC) interfaced to computer bus 31. Also interfaced to computer bus 31 is scanner interface 32 for interfacing to scanner 18, display interface 34 for interfacing to display 11, network interface 35 for interfacing to network line 22, printer interface 37 for interfacing to printer 24, keyboard interface 36 for interfacing to keyboard 15, and pointing interface 38 for interfacing to pointing device 16.

Read only memory (ROM) 41 interfaces with computer bus 31 so as to provide CPU 30 with specialized and invariant functions such as start-up programs or BIOS programs. Main memory 42 which includes random access memory (RAM) provides CPU 30 with memory storage both for data and application programs, as required. In particular, when executing stored program instruction sequences such as multimedia message management programs, CPU 30 normally loads those instruction sequences from disk 14 (or other program storage media) to main memory 42 and executes those stored program instruction sequences out of the main memory.

A communication board 40 which includes a data communication device is connected to computer bus 31 so as to provide computing equipment 10 with access to and control over multiple telephone lines and an ordinary telephone handset. The communication board device on 40 preferably includes a combined fax/modem/voice chipset such as the type described in the RC96ACL/RC144ACL Modem Designer's Guide, Rockwell International Digital Communications Division, published 1993, the contents of which are incorporated herein by reference. Such a fax/modem/voice chipset provides a facsimile modem for automatic facsimile transmission and reception, a data modem for automatic data transmission and reception and a digital voice communication capability for digitizing incoming voice communications and storing the digitized voice in a computer file, and/or converting a digitized voice in computer files into analog form for play out over voice telephone lines.

The communication board 40 further includes a data access arrangement (DAA) which includes a line select switch for selecting any one of multiple telephone lines for connection to the fax/modem/voice chipset. The DAA further includes the capability for connecting to external speaker 12 or microphone 13 as well as for connecting to ordinary voice telephone handset 19.

[First Embodiment]

Figure 3:
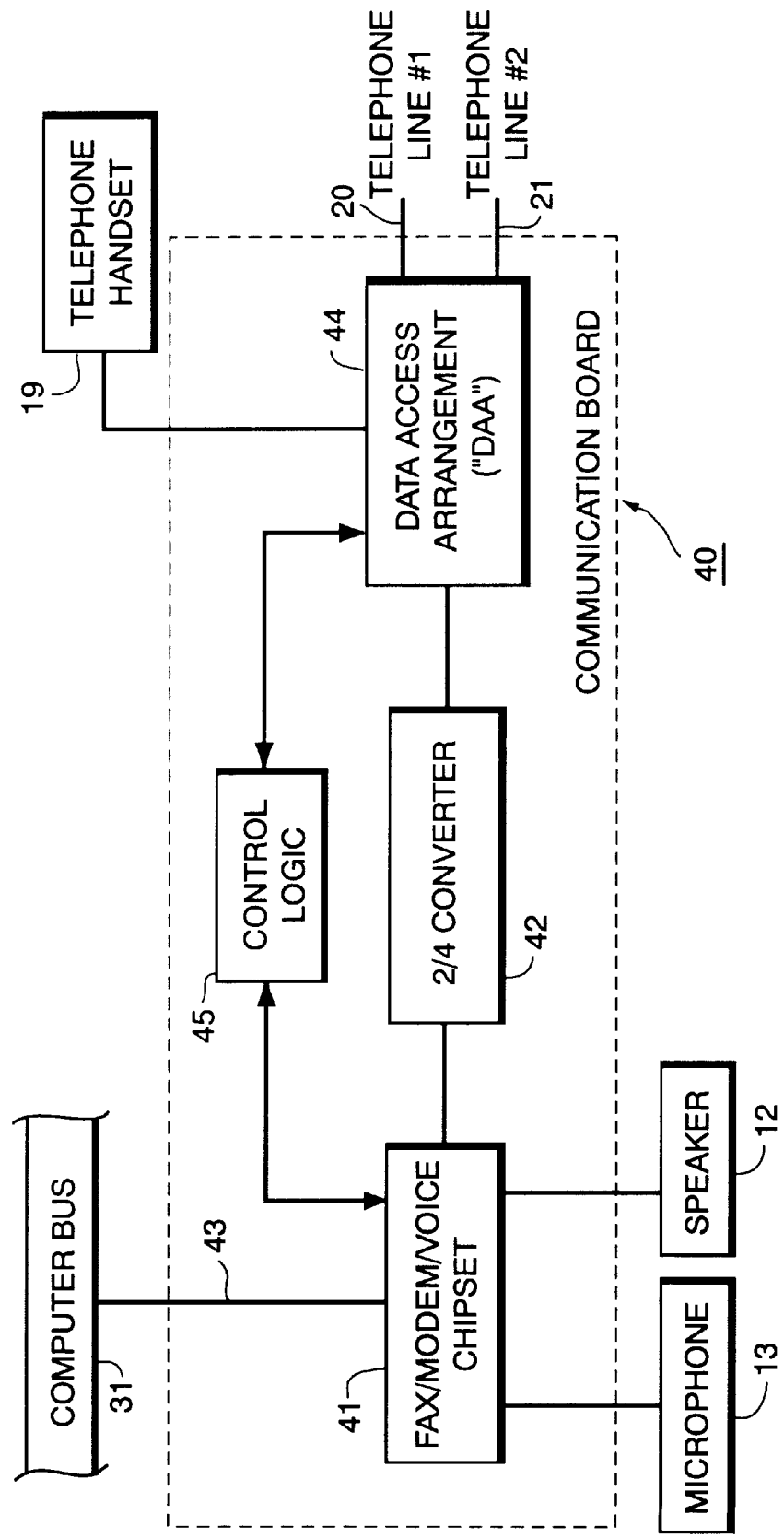
FIG. 3 is a functional block diagram of a first embodiment of a communication board for use with the invention.

FIG. 3 is a functional block diagram of a first embodiment of communication board 40. As shown in FIG. 3, communication board 40 includes a communication device such as the aforementioned fax/modem/voice chipset 41, and a 2/4 converter 42. The 2/4 converter 42 converts a four-wire signal from the fax/modem/voice chipset 41 into a two-wire signal for connection to ordinary voice telephone lines. The two-wire signal from 2/4 converter 42 is fed to data access arrangement (DAA) 44. The data access arrangement, under control via control logic 45 from chipset 41 and computing equipment 10, switchably connects one of multiple telephone lines, such as telephone lines 20 and 21, to the chipset via the 2/4 converter 42. Additionally, DAA 44 includes handset switches for each telephone line for switchably connecting, under control via control logic 45 from chipset 41 and computing equipment 10, one of the telephone lines to telephone handset 19.

Preferably, and as depicted in FIG. 3, the communication board 40 is arranged on a single, multiple-layer, circuit board provided with an edge connector 43 for connection to computer bus 31, as well as suitable RJ-14 connectors for connection to handset 19 and telephone lines 20 and 21. The single-board construction allows board 40 to be inserted into the housing of conventional PC-type computing equipment. Of course, while a single-board construction is preferred, the communication board 40 may, in fact, be comprised by multiple interconnected circuit boards.

Figure 4:
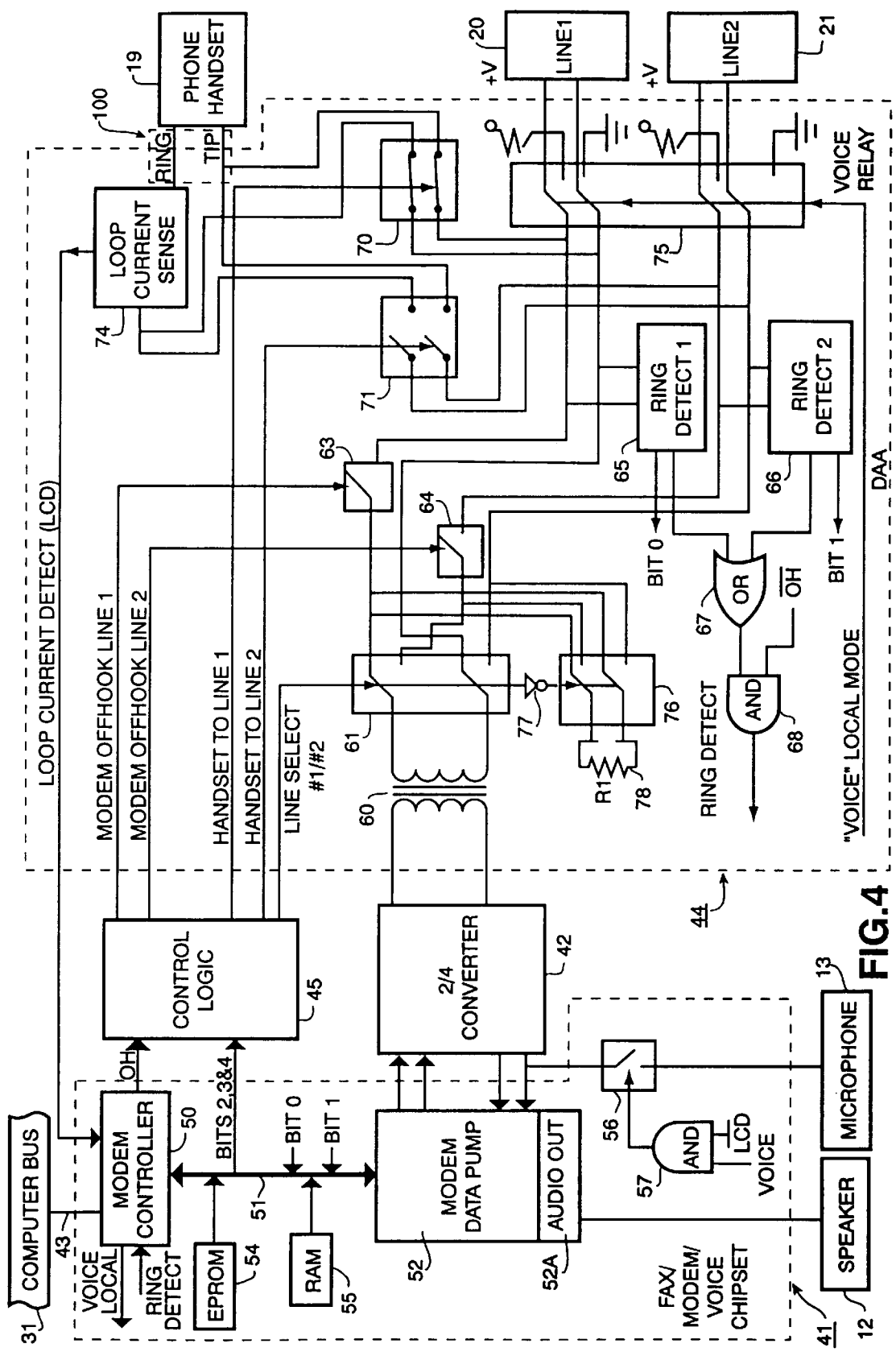
FIG. 4 is a schematic circuit diagram of the communication board shown in FIG. 3.

FIG. 4 is a schematic diagram illustrating the communication board of FIG. 3. As shown in FIG. 4, the fax/modem/voice chipset 41 includes a modem controller 50 connected via modem bus 51 to a modem data pump 52. Also connected to modem bus 51 are EPROM 54 and local RAM 55 which serve as memories for programming and processing operations of the modem and which may have a capacity of 128K bytes each. An audio path in chipset 41 includes an audio output interface portion 52a of the modem data pump which is connectable to speaker 12, as well as an audio-in switch 56 which permits connection to microphone 13 so as to provide the modem data pump 52 with an audio input interface under control of AND device 57.

In operation, modem controller 50, via commands and data sent from computing equipment 10 on computer bus 31, sets its state and the state of the modem data pump to one of audio in, audio out, fax modem, data modem or voice. Then, modem controller 50 causes modem data pump 52 either to output audio signals to speaker 12, to input audio signals from microphone 13, or to transmit or receive fax, modem or voice information via a four-wire connection to ⅔ converter 42.

⅔ converter 42 converts the four-wire connection from modem data pump 52 into a two-wire connection to data access arrangement (DAA) 44.

As further shown in FIG. 4, DAA 44 includes a transformer 60 for impedance-matching the two-wire signal from ⅔ converter 42 to the impedance of an ordinary voice telephone line. A line select switch 61 is provided to select one of multiple telephone lines, here two lines designated 20 and 21, respectively. The line selector switch 61 is operated under control from modem control logic 45 so as to select either of the two lines.

Each of the telephone lines has connected in series therewith a modem off-hook switch, specifically modem off-hook switch 63 for line 20 and 64 for line 21. Under control from control logic 45, each of those switches may be activated so as to cause the selected line to go off-hook with respect to fax/modem/voice chipset 41 when line select switch 61 has selected that line.

Ring detect circuits 65 and 66 detect ringing signals on each of lines 20 and 21, respectively. In response to a ringing signal, each ring detect circuit sets a bit in an unshown computer register indicating which of the lines 20 and 21 is ringing. In addition, the ring detect signals are ORed together via OR gate 67 and the resultant ORed signal sent to AND gate 68. The resultant ring detect signal is sent to modem controller 50 whereby modem controller 50 can recognize when one of line 20 and 21 is ringing. In this regard, AND gate 68 is provided so that a ring detect signal is blocked when modem controller 50 is engaged in modem operations. Thus, when either of lines 20 or 21 is off-hook via off-hook switches 63 and 64, an off hook signal OH is generated by modem controller 50. The OH signal blocks a ring detect signal in the event that either line is off-hook, thereby preventing modem controller 50 from being interrupted from its modem operations when one of the lines is off-hook and engaged in modem operations.

The DAA further includes for each telephone line a handset switch 70 and 71 for connecting lines 20 and 21, respectively, to telephone handset 19 via handset interface 100. The handset switches 70 and 71 are operated under control of control logic 45 via "handset to line 1" and "handset to line 2" control signals. These signals are set such that only one telephone line is connected to telephone handset 19 at any one time, and preferably they are set such that if data communications are being conducted on one telephone line, the handset is not connected to that line.

A loop current detect device 74 is positioned between the ring and tip wires of telephone handset 19 so as to sense a loop current when the handset in telephone handset 19 is lifted.

If a loop current is detected, then loop current detect device 74 sends a loop current detect (LCD) signal to modem controller 50 and to AND gate 57.

Telephone handset 19 is operable in either a manual mode or a computer-controlled mode. In the manual mode, when telephone handset 19 is lifted, it is connected to one of telephone lines 20 or 21 in accordance with the setting of handset switches 70 and 71. Manual outgoing dialing and voice communication may then occur.

For computer-controlled outgoing dialing, computing equipment 10 first causes modem controller 50 to select the desired lines 20 or 21 via line select switch 61. The appropriate one of off-hook switches 63 or 64 is then closed and the modem controller 50 causes modem data pump 52 to initiate telephone dialing such as DTMF or pulse dialing over the selected line. Handset switches 70 and 71 are set in accordance with the selected line, and the user is then instructed to lift the handset from telephone handset 19. As soon as loop current detect (LCD) signal is detected, indicating the presence of loop current between the tip and ring wires of telephone handset 19, modem controller 50 disconnects both of off-hook switches 63 and 64 to permit the user to conduct ordinary voice communication. If the user does not lift the handset from telephone handset 19, then the LCD signal will not be detected, and when the called party answers, the fax/modem/voice chipset 41 will operate in accordance with its ordinary programming.

For incoming calls, ring detect circuits 65 and 66 detect that one of the telephone lines carries a ringing signal, and signals that detection to modem controller 50 via AND gate 68. Computing equipment 10 reads its unshown computer register to determine which line is ringing, and control logic 45 then switches line select switch 61 to the appropriate line. In addition, control logic 45 sets handset select switches 70 or 71 to the ringing line. If, after a predetermined period such as two rings, the LCD signal is not detected indicating that the user has not lifted the handset, then control logic 45 causes the ringing line to go off-hook by setting modem off-hook switches 63 or 64, as appropriate. The fax/modem/voice chipset then operates in accordance with its pre-programmed instructions. Ordinarily, computing equipment 10 is programmed such that if the LCD signal is detected by the user lifting the handset from telephone handset 19, off-hook switches 63 and 64 are both disconnected leaving the user in ordinary voice communication with the calling party.

As mentioned above, if the fax/modem/voice chipset 41 is engaged in data communications via one of telephone lines 20 or 21, then the ring detect signal to chipset 41 is blocked via AND gate 68 because of the existence of the OH signal. Because the ring detect signal is blocked, chipset 41 will not be interrupted in its fax or modem or voice communications. At the same time, because handset switches 70 and 71 are ordinarily set to the unused telephone line, any incoming calls on that line will activate the ringer in telephone handset 19 thus alerting the user aurally to the presence of such a ringing signal.

DAA 44 further includes a voice relay 75 for setting DAA 44 to a voice local mode. In the voice local mode, voice relay 75 is activated to disconnect DAA 44 from all telephone lines and to connect the DAA to a $V^+$ voltage supply. In the voice local mode, the communication board can be used to play out sound over either speaker 12 or the speaker in telephone handset 19, or to record sound either from microphone 13 or from the microphone in telephone handset 19.

More specifically, when the voice-local mode is desired, a voice local mode signal is sent from modem controller 50 to voice relay 75 thereby disconnecting DAA 44 from all telephone lines and reconnecting it to V⁺. Thereafter, sound from modem data pump 52 may be heard over speaker 12 or the speaker in telephone handset 19. At the same time, sound may be recorded from either microphone 13 or from the microphone in telephone handset 19. In this regard, using loop current detect signal LCD, AND gate 57 will block recordal of sound from microphone 13 in the case that the handset has been lifted from the telephone handset 19 thereby preventing sound from being recorded from both the telephone handset and microphone 13 at the same time.

Relay 76 operates to force a busy signal on unselected ones of the multiple telephone lines. Thus, as shown in FIG. 4, relay 76 is connected to each of the telephone lines between the line select switch 61 and off-hook switches 63 and 64. The relay 76 is actuated through inverter 77 by the line select signal from control logic 45, and thus operates complementarily to the line select switch so as to connect the unused telephone line to resistor R1. Force busy is obtained by closing the off-hook switch for the unselected telephone lines, thereby connecting the telephone line to resistor R1 which has a value, e.g., 100 Ω, low enough to indicate to the telephone central office that the unused telephone line is busy. As an operational example, if line select switch 61 is set to select line #1, then because of inverter 77 force busy relay 76 connects resistor R1 to line #2. To force busy on line #2, control logic 45 causes modem off-hook switch 64, corresponding to line #2, to close. The telephone central office "sees" resistor R1 and interprets that resistor as an indication that line #2 is busy. Thus, callers calling into line #2 will receive a busy signal even though no physical telephone equipment (e.g., telephone handset 19 or chipset 41) is connected to line #2.

As mentioned above, control of the communication board is accomplished through bit settings in an unshown computer register. The following tables I and II show those bit settings:

TABLE I

I/O WRITE TO CONFIGURATION REGISTER (BASE +0)

| 7 | 6 | 5 | 4 | 3 | 2 | 1 | 0 |
|---|---|---|---|---|---|---|---|

- comm port setting
- 0: don't force busy on unselected lines
  1: force busy on unselected lines
- 0: handset to line #1
  1: handset to line #2
- 0: line select to line #1
  1: line select to line #2
- IRQ setting

TABLE II

I/O READ CONFIGURATION REGISTER +2 (BASE +2)

| 7 | 6 | 5 | 4 | 3 | 2 | 1 | 0 |
|---|---|---|---|---|---|---|---|

- line 1 ringing
- line 2 ringing

Figure 5:
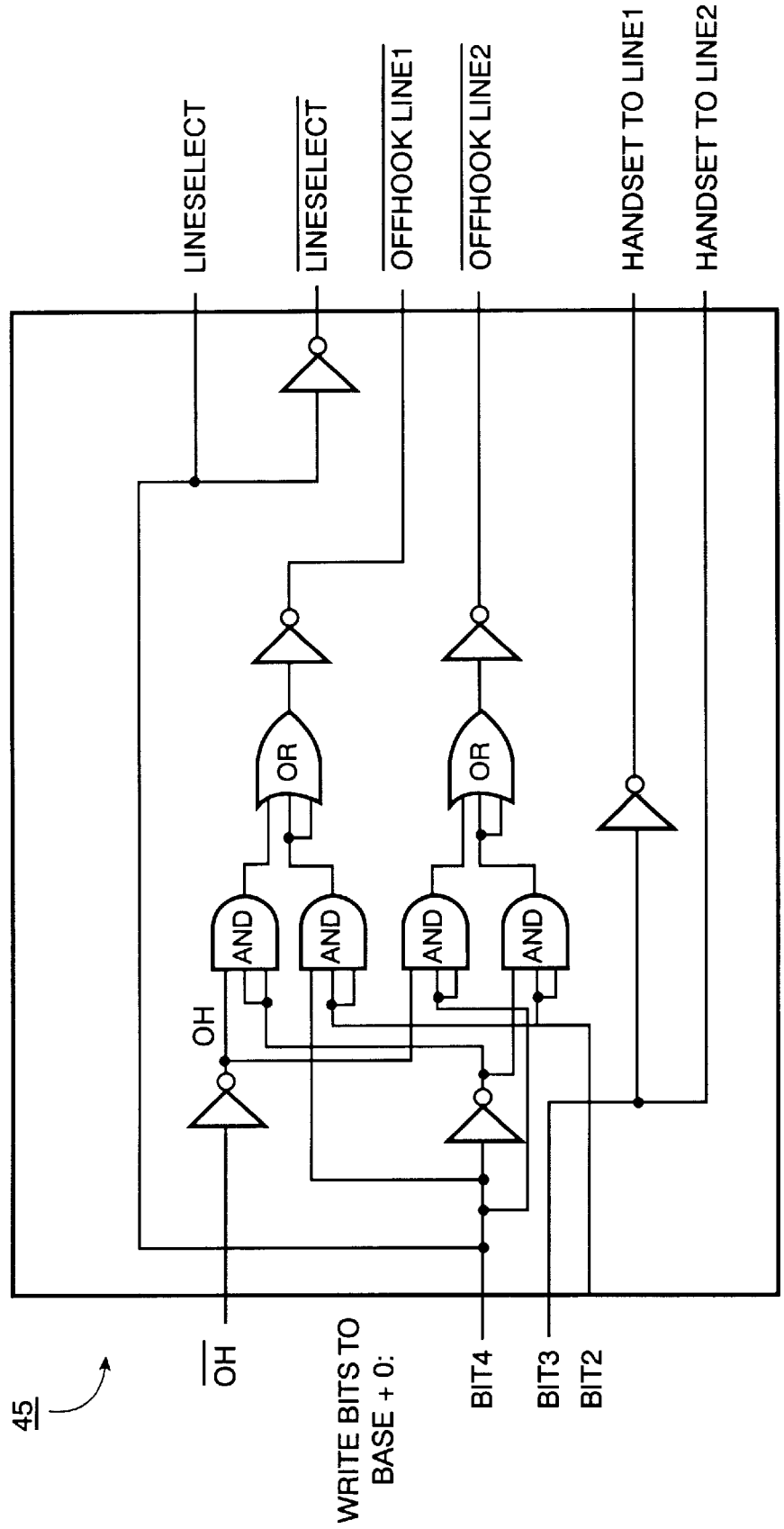
FIG. 5 is a schematic circuit diagram of the control logic shown in FIG. 4.

FIG. 5 is a detailed schematic diagram of control logic 45. As shown in FIG. 5, control logic 45 accepts the off-hook signal OH from modem controller 50 and combines it, using OR and AND gate logic circuitry, with control bits 2, 3 and 4 from "BASE +0" register so as to obtain the line select signal for line select switch 61, the modem off-hook signals for off-hook switches 63 and 64, and the handset signals for handset switches 70 and 71. The logic circuitry implements the following boolean equations:

LINE SELECT=BIT4

OFFHOOK LINE 1=(OH·$\overline{BIT4}$)+(BIT2·BIT4)

OFFHOOK LINE 2=(OH·BIT4)+(BIT2·$\overline{BIT4}$)

HANDSET TO LINE 1=$\overline{BIT3}$

HANDSET TO LINE 2=BIT3

More simply, as shown in Table I above, bit 3 controls handset switches 70 and 71, and bit 4 controls line select switch 61. As for off-hook switches 63 and 64, off-hook switch 63 (corresponding to line #1) is closed if modem controller 50 signals to go off-hook by raising off-hook signal OH and if line #1 is selected (i.e., bit 4=0), and also if line #2 is selected (i.e., bit 4=1) and bit 2 is set to force busy on unselected lines. Likewise, off-hook switch 64 (corresponding to line #2) is closed if modem controller 50 signals to go off-hook by raising off-hook signal OH and if line #2 is selected (i.e., bit 4=1), and also if line #1 is selected (i.e., bit 4=0) and bit 2 is set to force busy on unselected lines.

In operation, and in response to an incoming call on any of the phone lines, the system preferentially activates the data communication device, here the modem/fax/voice chipset, while activating the handset when the communication device is busy. In addition, the communication device is protected from unwanted interruptions while allowing a user manually to respond to incoming phones via the telephone handset 19. It is also possible to block incoming calls by forcing unused lines to a busy state. Such functionality is preferred in an unattended state where a user is unable to respond manually to incoming telephone calls while the communication device is in use. The reason why such functionality is desirable is because a caller calling an unattended station may become aggravated at an unanswered telephone line and will be less aggravated if a busy signal is instead obtained. In addition, automatic message dialing systems, such as remote facsimile machines, ordinarily have re-try modes for message dialing, and those re-try modes are activated only if a busy signal is obtained. Of course, it is possible to replace telephone handset 19 with an ordinary voice telephone answering machine to accommodate unattended operation.

In general, after detecting a ring detect signal, computing equipment 10 performs an I/O read of its "BASE +2"

register to determine which line is ringing. As shown in the above Table II, if bit 0 is set, then line 1 is ringing while if bit 1 is set then line 2 is ringing. After determining which line is ringing, the handset is moved to the ringing line by setting the appropriate one of handset switches 70 and 71. Then, by performing an I/O write to bit 4 of the "BASE +0" register, as shown in the above Table I, line select switch 61 is set to the ringing line, and by performing an I/O write to the BASE +0 register, the appropriate one of modem off-hook switches 63 and 64 is set to the ringing line. The call is then answered via chipset 41 or by the user lifting the handset of telephone handset 19, which action is detected by modem controller 50 through the loop current detect (LCD) signal, as described hereinabove.

Specific operations taking into consideration the current state of the telephone handset and the fax/modem/voice chipset are described as follows:

[Incoming Call On Line 1]

If neither the fax/modem/voice chipset 41 nor telephone handset 19 is in use, then computing equipment 10 connects both chipset 41 and telephone handset 19 to line 1 as described hereinabove.

If chipset 42 is not in use but line 2 is in use by telephone handset 19, then computing equipment 10 connects chipset 41 to line 1.

If chipset 41 is currently conducting communications on line 2, and telephone handset 19 is not in use, then computing equipment 10 moves telephone handset 19 to line 1 for attended voice operation. Alternatively, by setting bit 2 of "BASE +0", which causes unselected lines to appear "busy" to the telephone central office, it is possible to force busy on line 1 for unattended operation.

If both the modem and the phone handset are conducting communication on line 2, then line 1 is forced busy by setting bit 2, as described above.

[Incoming Call On Line 2]

If neither chipset 41 and telephone handset 19 are in use, computing equipment 10 connects both chipset 41 and telephone handset 19 to line 2.

If chipset 41 is conducting communication on line 1, and telephone handset 19 is not in use, then computing equipment 10 connects telephone handset to line 2 for attended operation. Alternatively, it is possible to force busy on line 2 by setting bit 2 of "BASE +0" register for unattended operation.

If chipset 41 is not in use but telephone handset 19 is in use with line 1, then computing equipment 10 connects chipset 41 to line 2.

If both chipset 41 and telephone handset 19 are conducting communication on line 1, then line 2 is forced busy by setting bit 2 of "BASE +0" register.

[Outgoing Calls From Chipset 41]

For an outgoing call by chipset 41, then computing equipment 10 preferentially connects chipset 41 to the first available line, i.e., first line 1 or if line 1 is in use then to line 2. Alternatively, it is possible for computing equipment 10 to override this automatic selection by appropriate writes to bits in the "BASE +0" register.

[Outgoing Calls From Handset 19]

For outgoing calls on telephone handset 19, then if neither telephone line is in use, computing equipment 10 connects telephone handset 19 in reverse preferential order to that of chipset 41. Thus, computing equipment 10 first connects telephone handset to line 2, or if line 2 is in use by chipset 41 then to line 1.

In the event of an outgoing call from the telephone handset while line 1 or line 2 is in use by chipset 41 it is possible for computing equipment 10 to allow the user to "break into" the phone call by chipset 41. In this instance, computing equipment 10 forces handset switches 70 and 71 into their appropriate state and allows the user to break into the line by lifting the handset.

In summary, for the above situation, the "preferential order" for selecting one of the telephone lines for connection to the data communication device is line 1 followed by line 2. Accordingly, the "reverse preferential order" for selecting one of the telephone lines for connection to the telephone handset is line 2 followed by line 1.

[Hold Feature]

Figure 6:
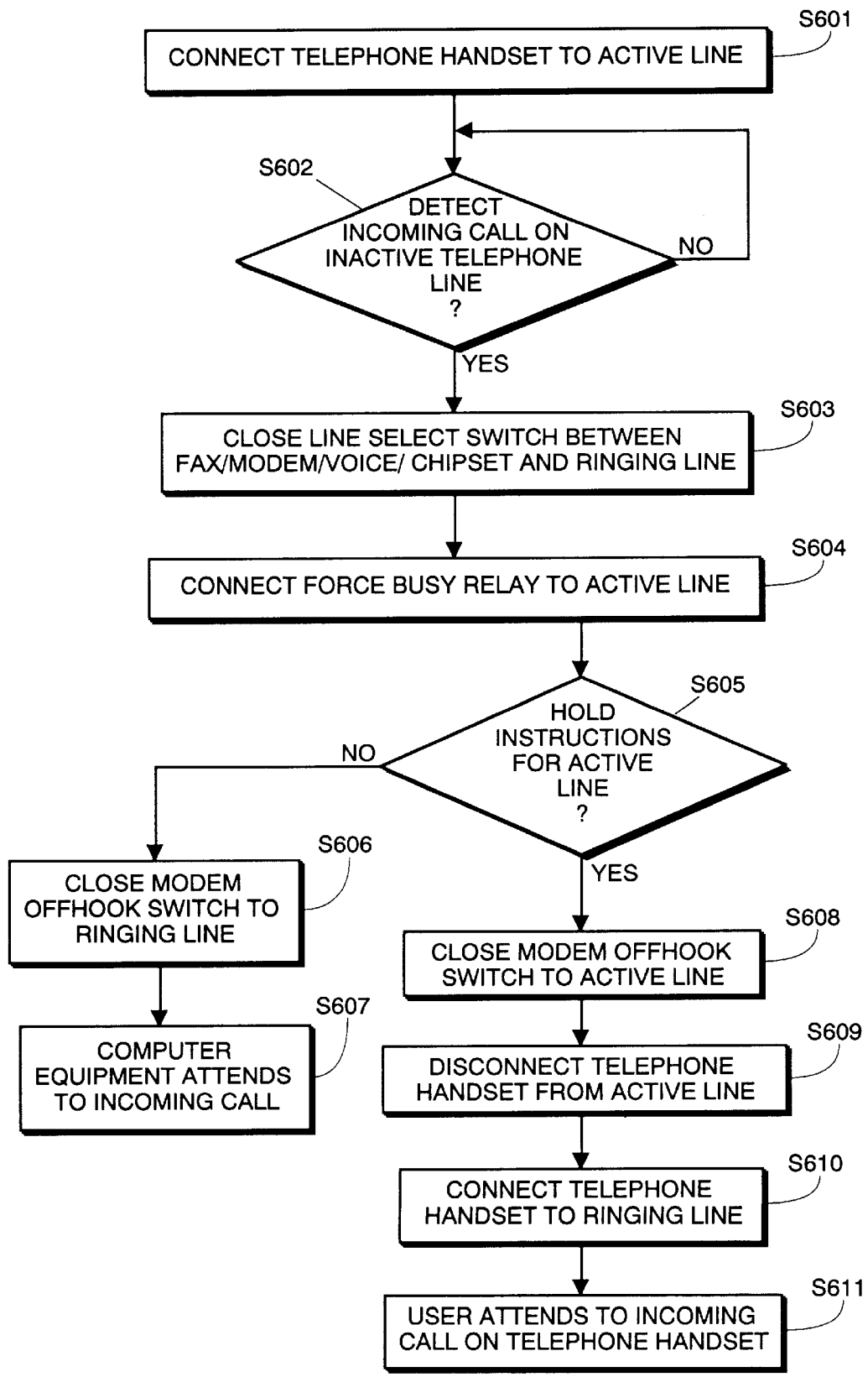
FIG. 6 is a flow diagram showing operation of the communication board to place a currently active telephone line on hold.

FIG. 6 is a flow diagram showing process steps by which the same force busy relay 76 that is used to force a busy signal on an unused line can also be used to implement a hold feature. Briefly, according to FIG. 6, in a case where telephone handset 19 is currently being used for voice communication on an active telephone line and an incoming call is detected on an inactive telephone line, the active telephone line can be put on hold by (1) switching the line select switch to the ringing line so as to ready the computerized telephone equipment for connection to the ringing line, thereby switching the force busy switch to the active line in view of the complementary operation of the line select switch and the force busy relay (via inverter 77), (2) responding to a hold instruction by closing the modem off-hook relay (63 or 64) corresponding to the active telephone line, thereby connecting the force busy means across the active telephone line, (3) disconnecting the telephone handset from the active telephone line, and (4) connecting the telephone handset to the ringing line. Because the force busy resistor 78 is now connected across the formerly active telephone line, even though the telephone handset has been disconnected from that formally active telephone line, loop current is maintained thereby keeping the formerly active telephone line on hold while the user attends to the incoming call on the ringing telephone line via the telephone handset.

Referring specifically to the process steps shown in FIG. 6, since it is assumed that a user is conducting a voice telephone communication with a currently active telephone line, step S601 shows the telephone handset connected to an active telephone line, using an appropriate one of handset select switches 70 or 71 in accordance with which of line 20 or 21 is the active telephone line. Until an incoming call is detected on an inactive telephone line, flow remains at step S602. It should, of course, be realized that the process steps shown in FIG. 6 are directed to the hold feature only, and that other processes including communication processes are ongoing and do not result in the apparent "infinite loop" shown at step S602.

When an incoming telephone call is detected on an inactive telephone line, flow advances to step S603 in which line select switch 61 is operated so as to ready the computerized telephone equipment to answer the incoming call on the ringing line. Specifically, line select switch 61 is closed so as to connect between fax/modem/voice chipset 41 (via ⅔ converter 42) and the ringing line. At this point, however, since neither one of modem off-hook switches 63 or 64 is closed, the fax/modem/voice chipset 41 is not actually connected to the ringing line.

Flow then advances to step S604 in which force busy relay 76 is connected to the active line. This step happens automatically, in view of the complementary relation established by inverter 77 between line select switch 61 and force busy relay 76.

Flow then advances to step S605 which determines whether an instruction has been received to place the active line on hold. The instruction may be received from an unshown interface on telephone handset 19, or may be issued by the user via a graphical user interface on screen 11.

Whatever its source, if the hold instruction is not issued, flow advances to step S606 (for example, after a predetermined number of rings) in which the modem off-hook switch corresponding to the-ringing telephone line is closed, and thence to step S607 in which the computer equipment attends to the incoming call.

On the other hand, if step S605 determines that a hold instruction has been received, then flow advances to step S608 in which the modem off-hook switch for the active line is closed. Closing the modem off-hook switch for the active line causes the force busy resistor 78 to be connected across the active telephone line. Thereafter, in step S609, the telephone handset is disconnected from the active telephone line. However, because force busy resistor 78 is now connected across the active line, loop current is maintained in the active line thereby placing and maintaining the currently active telephone line in a hold state. Flow then advances to step S610 in which the telephone handset is connected to the ringing line via the appropriate one of handset switches 70 and 71. The user is then free to attend to the incoming call on telephone handset 19 (step S611).

Figure 7B:
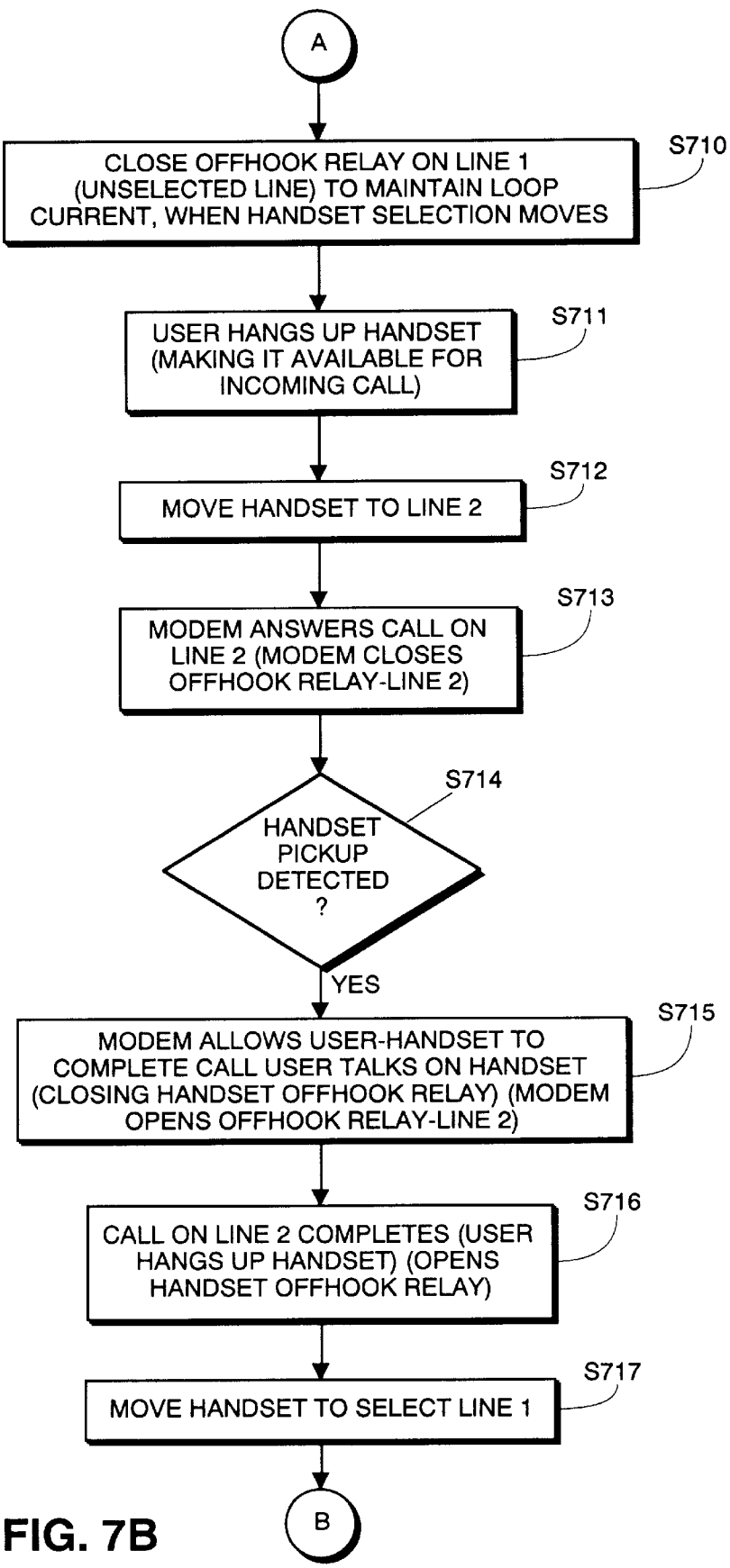
FIG. 7 is a flow diagram showing a representative example of the hold feature, in which an active voice call on line 1 is put on hold to permit answering an incoming call on line 2.
Figure 7C:
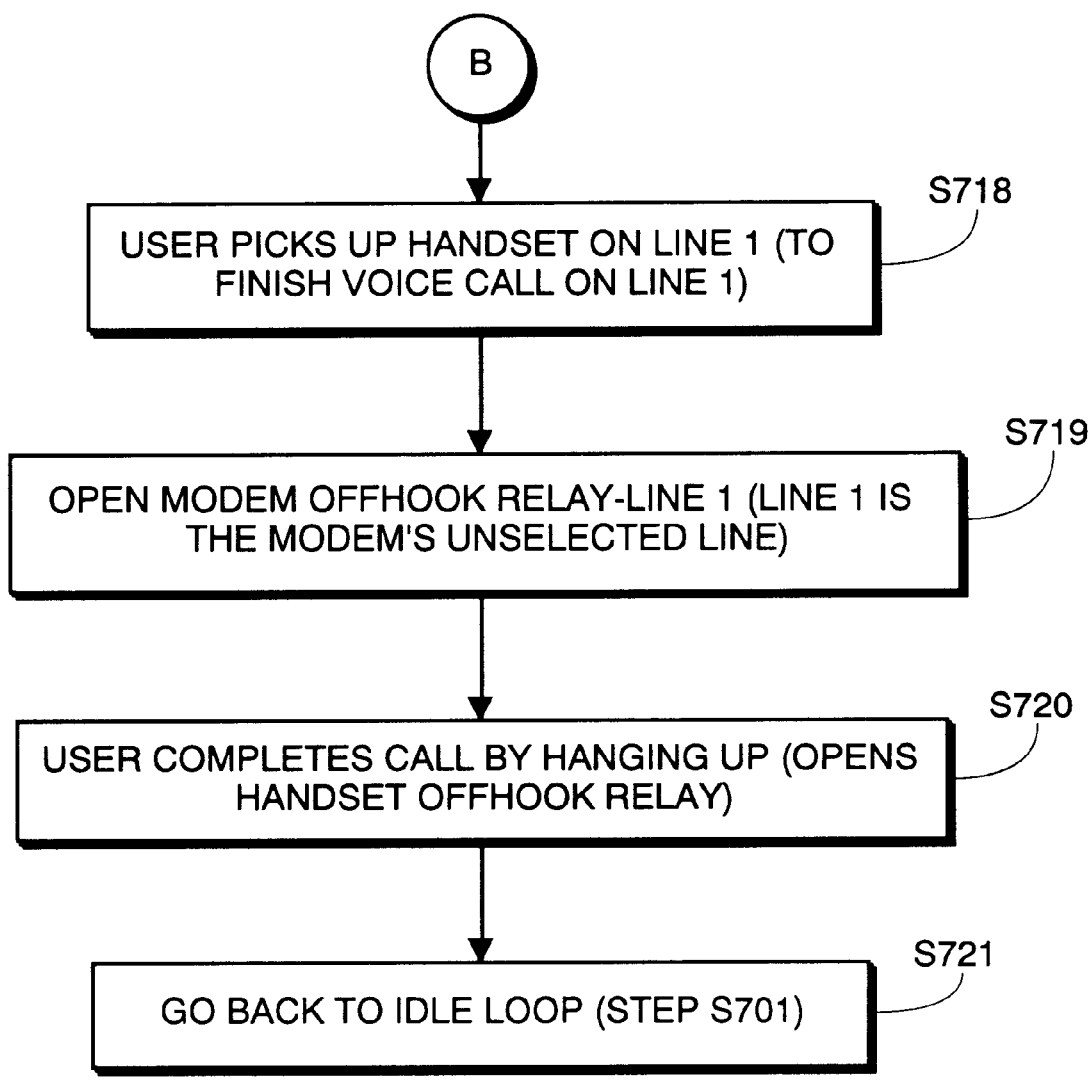

FIG. 7 shows a representative example of the above process in a case where a first telephone call is received on line 1, and a second telephone call is then received on line 2. Thus, in step S701, an incoming ring is detected, and after determining that the incoming ring is on line 1 (step S702), flow advances to step S703 in which line select switch 61 is moved so as to connect between fax/modem/voice chipset 41 and line 1, and in which handset select switch 70 is closed so as to also connect telephone handset 19 to line 1. After a predetermined number of rings in which the user does not lift telephone handset 19, modem off-hook switch 63 is closed so that the computerized telephone equipment answers the incoming call (step S604). Upon detecting that the user has lifted the telephone handset in step S705, flow advances to step S706 in which modem off-hook switch 63 is opened so as to allow the user to take over the active telephone line using telephone handset 19. In step S707, an incoming ring is detected on the inactive line, and upon determining that the ringing line is line 2 (step S708), line select switch 61 is operated so as to connect between fax/modem/voice chipset 41 and the ringing line (step S709). Because of the complementary relation established by inverter 77, force busy relay 76 connects force busy resistor 78 across the active line. At this point, however, since modem off-hook switch 64 is not closed, the ringing line remains unanswered.

Upon receipt of a hold instruction, flow advances to step S710 in which off-hook relay 63, corresponding to the active line 1 and not the ringing line 2, is closed so as to connect force busy resistor 78 to the active line. The user then hangs up the handset (step S711) and handset select switch 70 for the active line is opened. However, because force busy resistor 78 is connected to the active line, loop current is maintained.

In step S712, handset select switch is closed so as to connect telephone handset 19 to the ringing line. At the same time, in step S713, off-hook relay 64, also corresponding to the ringing line, is closed so as to connect fax/modem/voice chipset 41 to the ringing line and to permit the computerized telephone equipment to answer the incoming call.

In step S714, upon detection that the user has picked up the handset for telephone handset 19, flow advances to step S715 in which the modem allows the user to complete the call. Specifically, off-hook switch 64 is opened so as to disconnect the modem from the incoming call thereby allowing a user to carry on a voice communication over the telephone handset.

In step S716, when the user completes his call and hangs up his handset, handset select switch 71 is opened and handset select switch 70 is closed thereby allowing the user to complete the call on line 1 (step S718). At the same time, in step S719, modem off-hook relay 63, corresponding to line 1, is opened so as to disconnect force busy resistor 78 from the again-active line 1. In step S720, the user completes the call on line 1 and hangs up, whereupon flow advances to step S721 in which the computer reverts to its idle loop.

[Second Embodiment]

Figure 8:
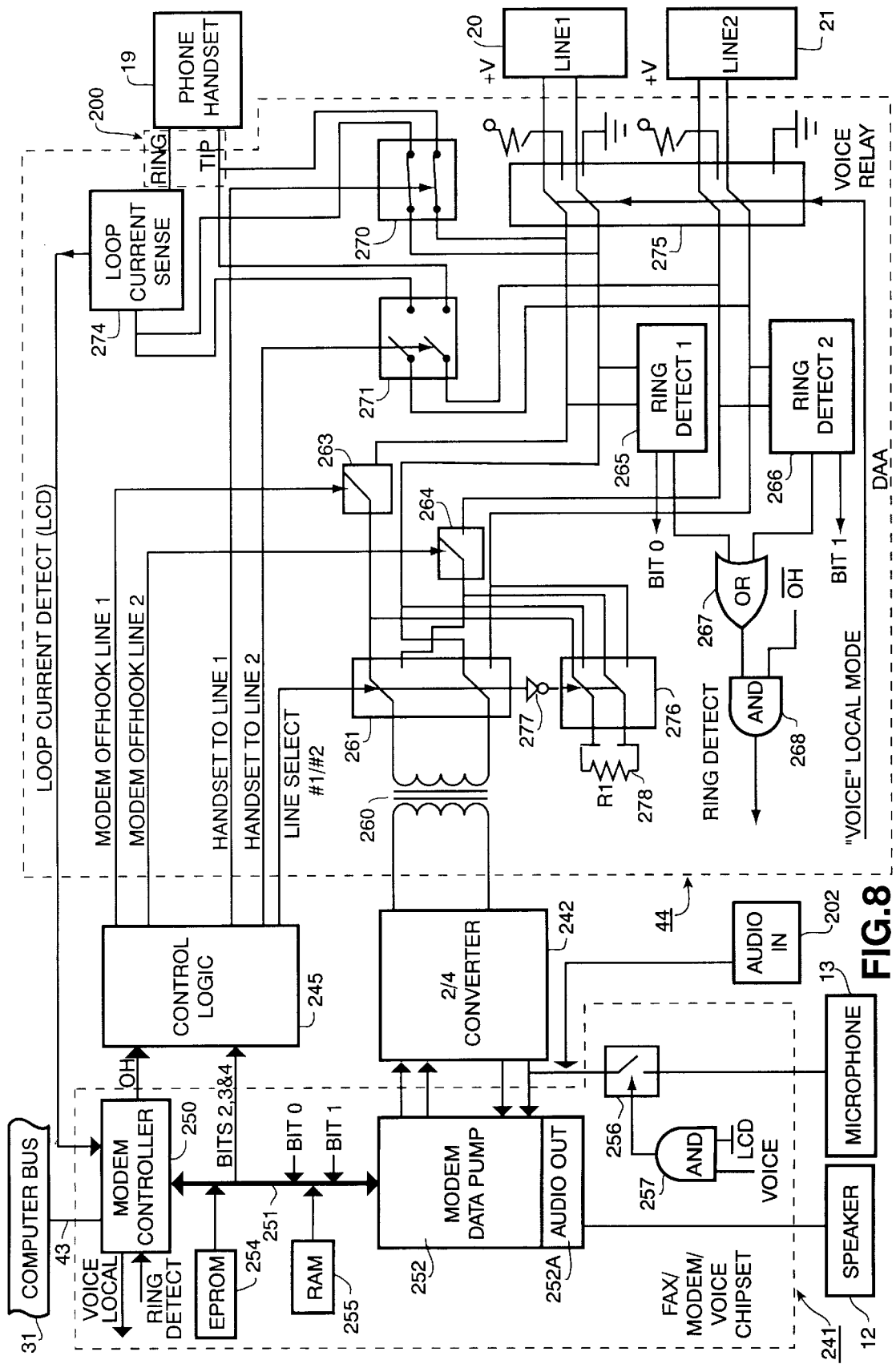
FIG. 8 is a schematic circuit diagram of a second embodiment of a communication board for use with the invention.

FIG. 8 is a schematic diagram illustrating a second embodiment of a communication control board for use with the invention. Using the communication board of FIG. 8, it is possible to place a currently active telephone line on hold and to play out audio information such as music over the held line, thereby allowing the held caller to listen to music while on hold.

The communication board of FIG. 8 is identical in all respects with the communication board of FIG. 4, with the exception of audio in input 102. Imput 102 allows fax/modem/voice chipset 41, while in the voice mode, to mix pre-recorded audio information through 2/4 converter 42 for playout. A suitable communication board, which includes an audio input such as that illustrated at 202, is described in application No. 08/341,165 filed Jan. 19, 1993, "Communication Control Board With Audio Function".

Inasmuch as the communication board of FIG. 8 is identical in all respects with FIG. 4, with the exception of added audio input 202, the processes of FIGS. 6 and 7 are completely usable with the communication board of FIG. 8, and they are incorporated here again without repetition.

Figures 9, 9A:
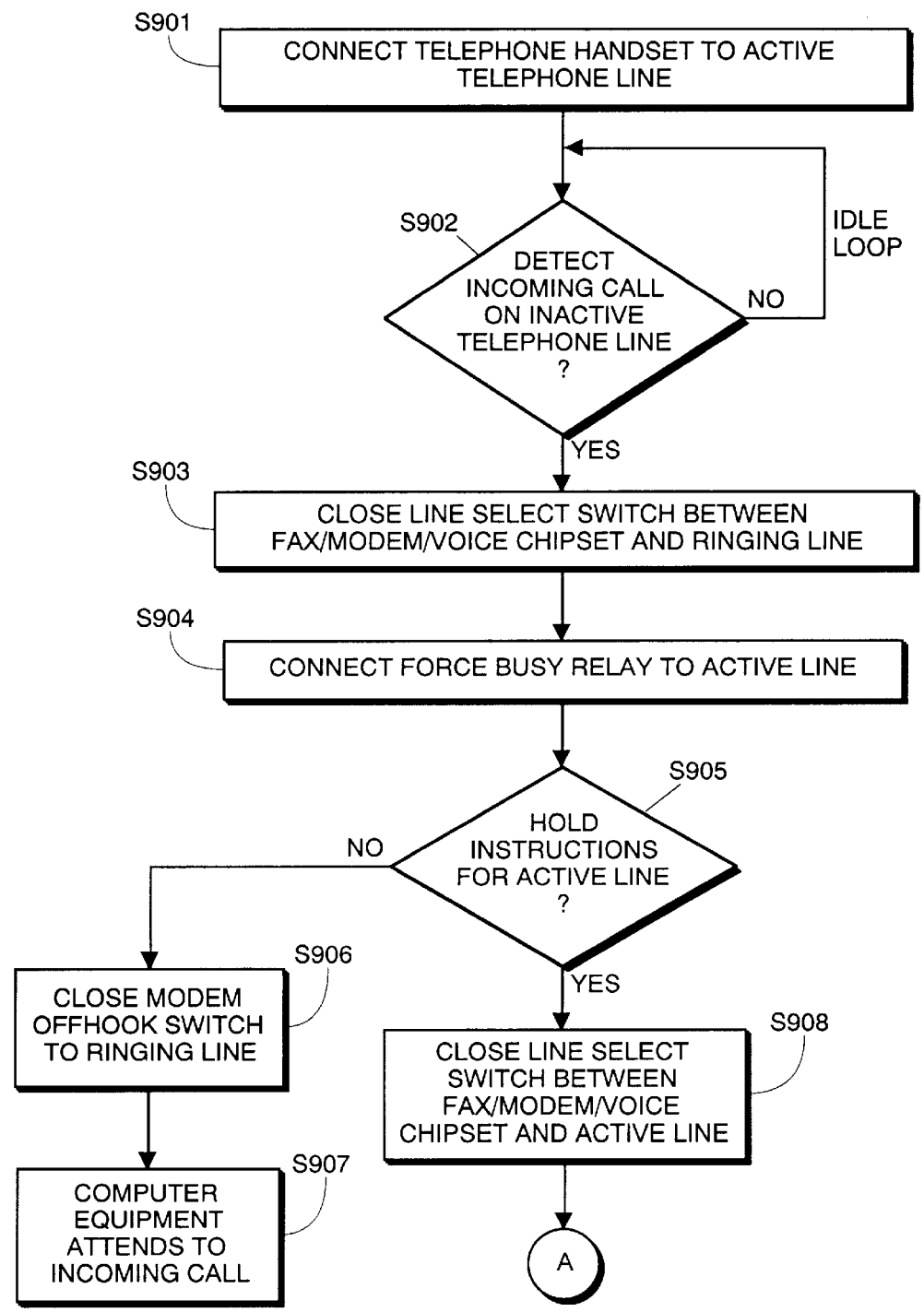
FIG. 9 is a flow diagram showing operations to put a currently active telephone line on hold.
Figure 9B:
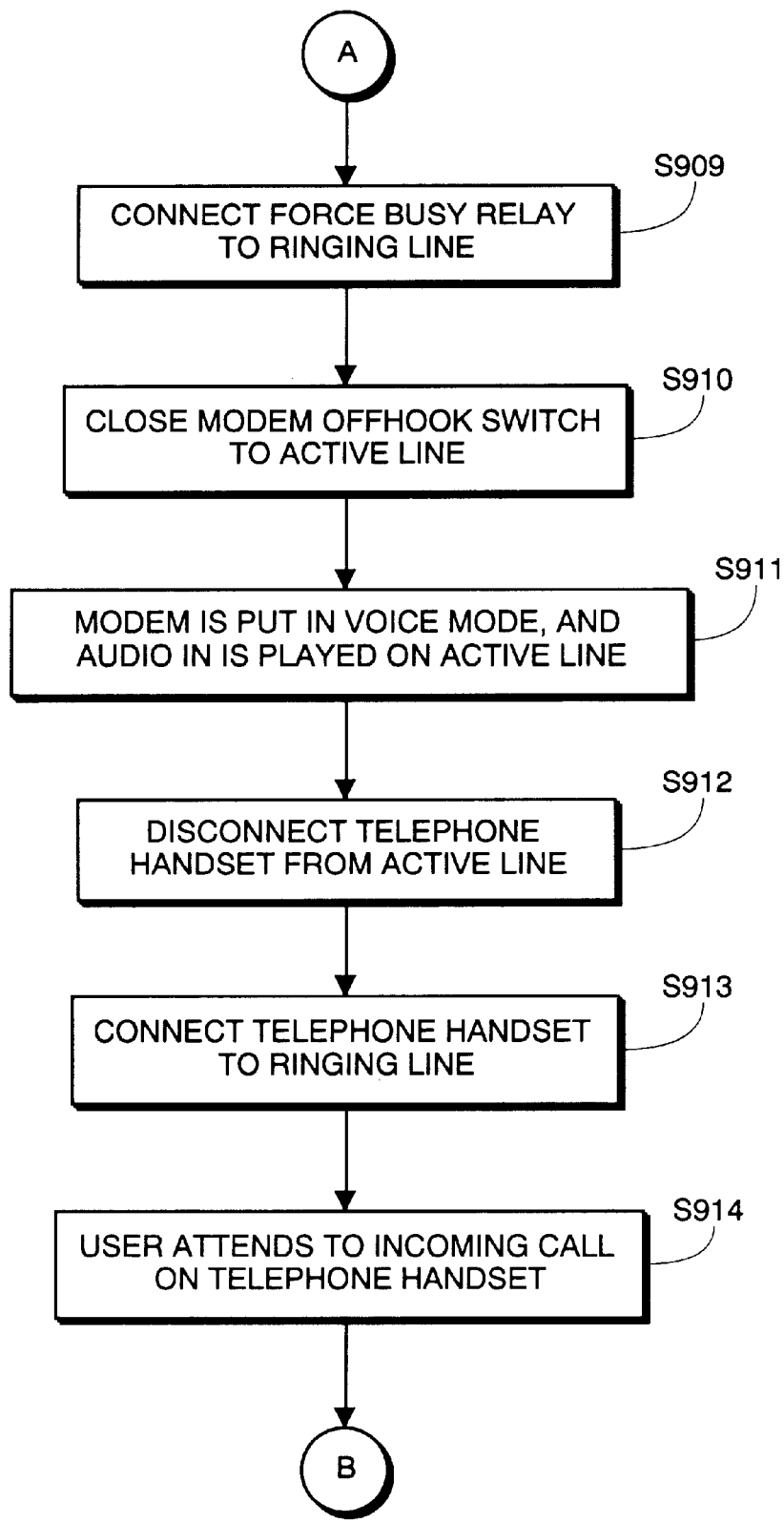
Figure 9C:
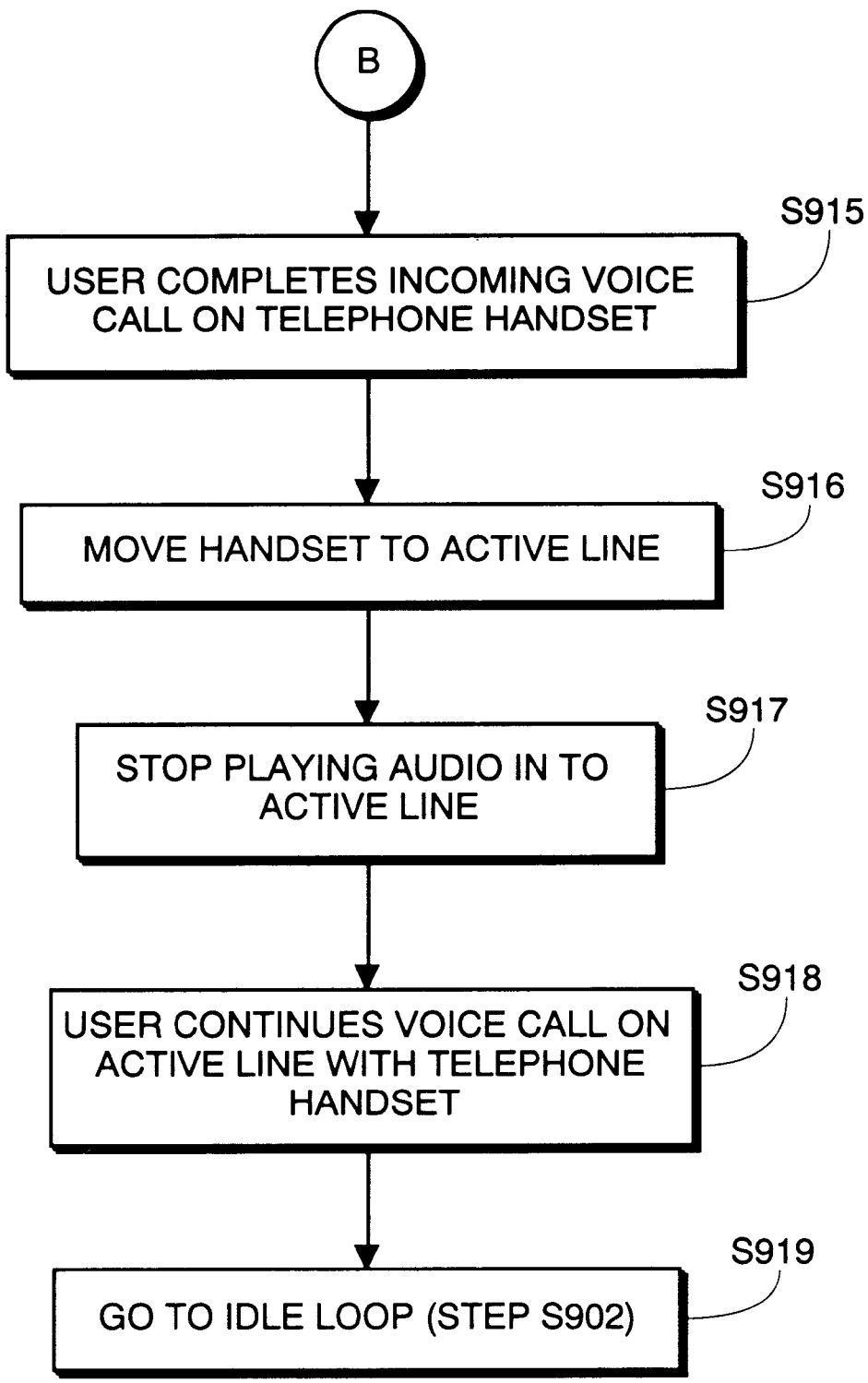

FIG. 9 is a flow diagram showing use of the FIG. 8 communication board to put an active line on hold and to play out audio information, such as music, on the held line using audio input 202. Step S901 shows a telephone handset connected to an active telephone line, using an appropriate one of handset select switches 270 or 271 in accordance with which of lines 20 or 21 is the currently active telephone line. Until an incoming telephone call is detected on an inactive telephone line, flow remains in an idle loop at step S902. It should, of course, be realized that the process steps shown in FIG. 9 are directed to the hold feature only, and that other processes, including communication processes, are still on-going and do not result in the apparent "infinite loop" shown at step S902.

When an incoming telephone call is detected on an inactive telephone line, flow advances to step S903 in which line select switch 261 is operated so as to ready the computerized telephone equipment to answer the incoming call on the ringing line. Specifically, line select switch 261 is closed so as to connect between fax/modem/voice chipset 241 (via 2/4 converter 242) and the ringing line. At this point, however, since neither one of modem off-hook switches 263 or 264 is closed, the fax/modem/voice chipset is not actually connected to the ringing line.

Flow then advances to step S904 in which force busy relay 276 is connected to the active line. This step happens automatically, in view of the complementary relation established by inverter 277 between line select switch 261 and force busy relay 276.

Flow then advances to step S905 which determines whether an instruction has been received to place the active line on hold. The instruction may be received from an unshown interface on telephone handset 19, or may be issued by the user via a graphical user interface on screen 11. Whatever its source, if the hold instruction is not issued, flow advances to step S906 (for example, after a predetermined number of rings) in which the modem off-hook switch corresponding to the ringing telephone line is closed, and thence to step S907 in which the computer equipment attends to the incoming call.

On the other hand, if step S905 determines that a hold instruction has been received, then flow advances to step S908 in which the line select switch 261 is closed between fax/modem/voice chipset 241 and the active telephone line. This automatically re-connects the force busy relay 276 to the ringing line (step S909). The modem off-hook switch 263 or 264 which corresponds to the active line is then closed (step S910) which completes loop current and causes the active line to be placed on hold. Step S911 puts the modem into voice mode, and audio in is thereafter played on the held active line via audio input 202.

Meanwhile, the telephone handset is disconnected from the active telephone line (step S912) which, in step S910, had been placed into a hold state. Step S913 connects the telephone handset to the ringing line via handset select switch 270 or 271 (corresponding to which of the telephone lines 20 and 21 is ringing) whereafter the user attends to the incoming call using the telephone handset 19 (step S914).

After completing the incoming voice call (step S915), the handset is moved back to the held active line (step S916) by closing whichever of handset select switches 270 or 271 corresponds to the held active line. Step S917 stops playing audio input to the active line, and the user continues his voice call on the active line using the telephone handset (step S918). If desired, whichever one of the modem off-hook switches 263 or 264 that had been closed in step S910 may now be opened so as to disconnect fax/modem/voice chipset 241 from the active telephone line. In either event, flow then returns to the idle loop (step S902) so as to await detection of additional incoming calls on the inactive telephone line.

The invention has been described with respect to particular illustrative embodiments. It is to be understood that the invention is not limited to the above described embodiments and that various changes and modifications may be made by those of ordinary skill in the art without departing from the spirit and scope of the invention.

What is claimed is:

1. In a telephone controller having a line select switch which connects computerized telephone communication equipment to a selected one of at least two telephone lines through off-hook relays respectively provided between the line select switch and each such telephone line, and a force busy switch which operates complementarily to the line select switch and by which a common force busy means that is common to at least first and second telephone lines is connectable across unselected ones of the telephone lines through the respective off-hook relays so as to maintain loop current in the unselected ones of the telephone lines, said telephone controller further having at least first and second handset select switches respectively provided for said first and second telephone lines so as to connect a telephone handset interface to any one of the telephone lines, a method for controlling the line select switch, the force busy switch, the off-hook relays, and the first and second handset select switches, so as to place and maintain a currently active one of the telephone lines in a hold state, the method comprising the steps of:

closing the first handset select switch so as to connect the telephone handset interface to the first telephone line which is currently active;

detecting an incoming call on the second telephone line;

switching the line select switch to the second telephone line so as to ready the computerized telephone communication equipment for connection to the second telephone line whereby by virtue of its complementary operation, the force busy switch is switched so as to ready at least the first telephone line for connection to the common force busy means;

receiving an instruction to place the first telephone line on hold; and responding to the hold instruction by closing an off-hook relay for the first telephone line so as to connect the common force busy means across the first telephone line, opening the first handset select switch, and closing the second handset select switch so as to connect the telephone handset interface to the second telephone line.

2. A method according to claim 1, wherein until receipt of the instruction to place the first telephone line on hold, further comprising the steps of closing an off-hook relay for the second telephone line, thereby connecting the computerized telephone communication equipment to the ringing telephone line.

3. A method according to claim 2, wherein said responding step further includes the step of opening the off-hook relay for the second telephone line.

4. A method according to claim 3, wherein in response to termination of voice communication on the second telephone line via the telephone handset interface, further comprising the steps of opening the second handset select switch, closing the first handset select switch, and opening the off-hook relay for the first telephone line.

5. A method according to claim 4, wherein in response to termination of voice communication on the first telephone line via the telephone handset interface, further comprising the step of opening the first handset select switch.

6. A method according to claim 1, wherein in response to termination of voice communication on the second telephone line via the telephone handset interface, opening the second handset select switch, closing the first handset select switch, and opening the off-hook relay for the first telephone line.

7. A method according to claim 6, wherein in response to termination of voice communication on the first telephone line via the telephone handset interface, further comprising the step of opening the first handset select switch.

8. A method according to claim 1, wherein the step of switching the line select switch to the second telephone line and the step of receiving an instruction to place the first telephone line on hold occur in response to user commands input via a graphical user interface displayed on the computerized telephone communication equipment.

9. A method according to claim 1, wherein the line select switch connects computerized telephone communication equipment to a selected one of two telephone lines.

10. In a telephone controller having a line select switch which connects computerized telephone communication equipment to a selected one of at least two telephone lines through off-hook relays respectively provided between the line select switch and each such telephone line, and a force busy switch which operates complementarily to the line select switch and by which a common force busy means that is common to at least first and second telephone lines is connectable across unselected ones of the telephone lines through the respective off-hook relays so as to maintain loop current in the unselected ones of the telephone lines, said telephone controller further having at least first and second handset select switches respectively provided for said first and second telephone lines so as to connect a telephone handset interface to any one of the telephone lines, a method for controlling the line select switch, the force busy switch, the off-hook relays, and the first and second handset select switches, so as to place one of the telephone lines in one of a plurality of states including a hold state and a force busy state, the method comprising the steps of:

closing the first handset select switch so as to connect the telephone handset interface to the first telephone line which is currently active;

placing the first telephone line in the hold state using the common force busy means upon receipt of an instruction to place the first telephone line in the hold state; and placing the second telephone line in the force busy state using the common force busy means upon receipt of an instruction to place the second telephone line in the force busy state.

11. The method of claim 10, wherein placing the first telephone line in the hold state further comprises the steps of:

switching the line select switch to the second telephone line so as to ready the computerized telephone communication equipment for connection to the second telephone line whereby by virtue of its complementary operation, the force busy switch is switched so as to ready at least the first telephone line for connection to the common force busy means; and closing an off-hook relay for the first telephone line so as to connect the common force busy means across the first telephone line, opening the first handset select switch, and closing the second handset select switch so as to connect the telephone handset interface to the second telephone line.

12. The method according to claim 10, wherein placing the second telephone line in the force busy state further comprises the steps of:

maintaining the line select switch switched to the first telephone line so as to maintain the telephone handset interface connected to the first telephone line, whereby by virtue of its complementary operation, the force busy switch maintains at least the second telephone line ready for connection to the common force busy means; and closing an off-hook relay for the second telephone line so as to connect the common force busy means across the second telephone line.

\* \* \* \* \*